March 28, 1950 — C. M. SAVRDA — 2,502,176
FISH-FILLETING MACHINE
Filed Oct. 1, 1947 — 3 Sheets-Sheet 1
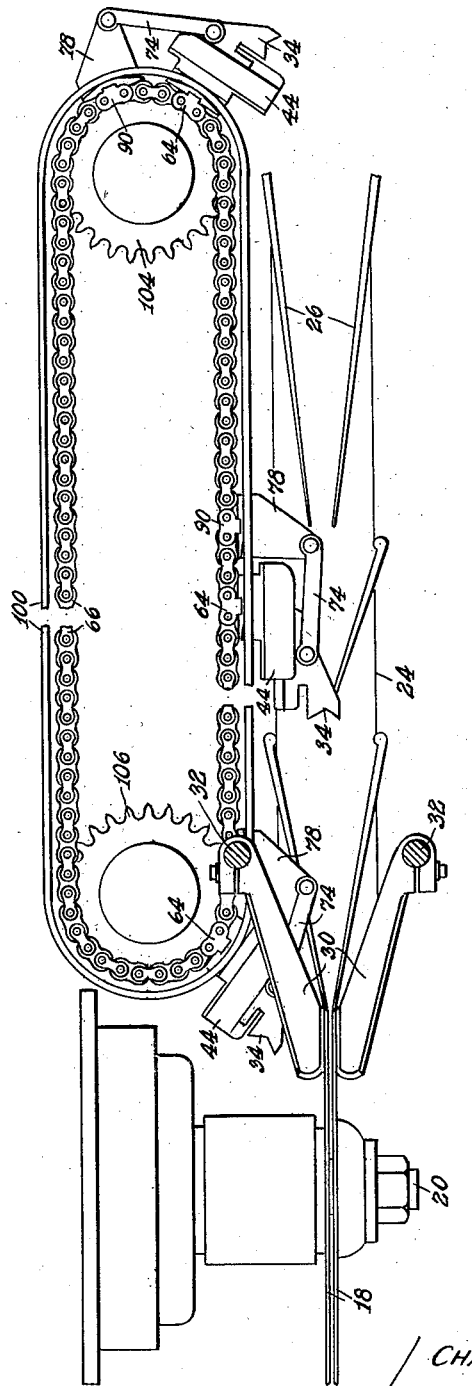
INVENTOR.
CHARLES M. SAVRDA
BY
ATTORNEY March 28, 1950   C. M. SAVRDA   2,502,176
FISH-FILLETING MACHINE
Filed Oct. 1, 1947   3 Sheets-Sheet 2
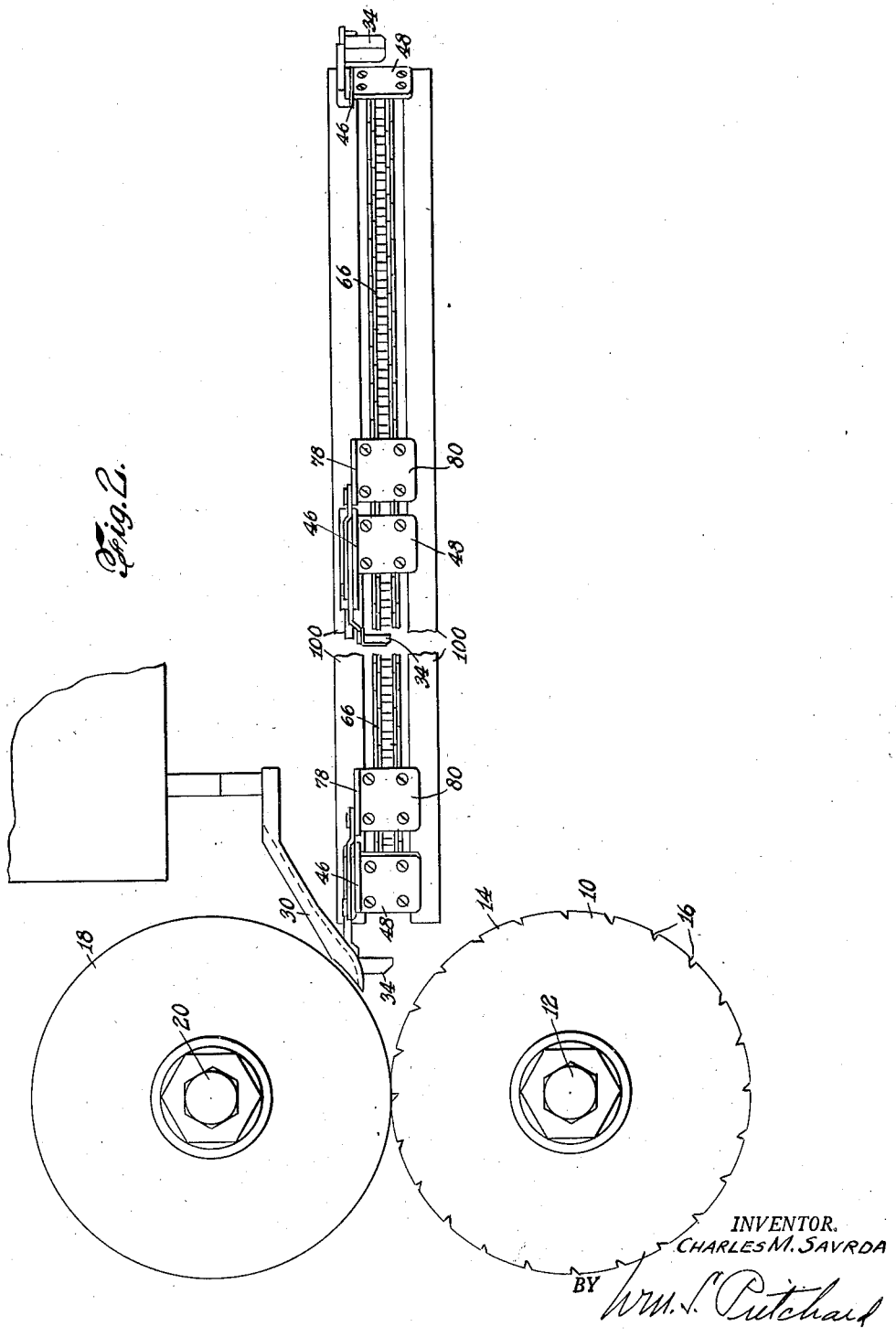
INVENTOR.
CHARLES M. SAVRDA
BY
ATTORNEY

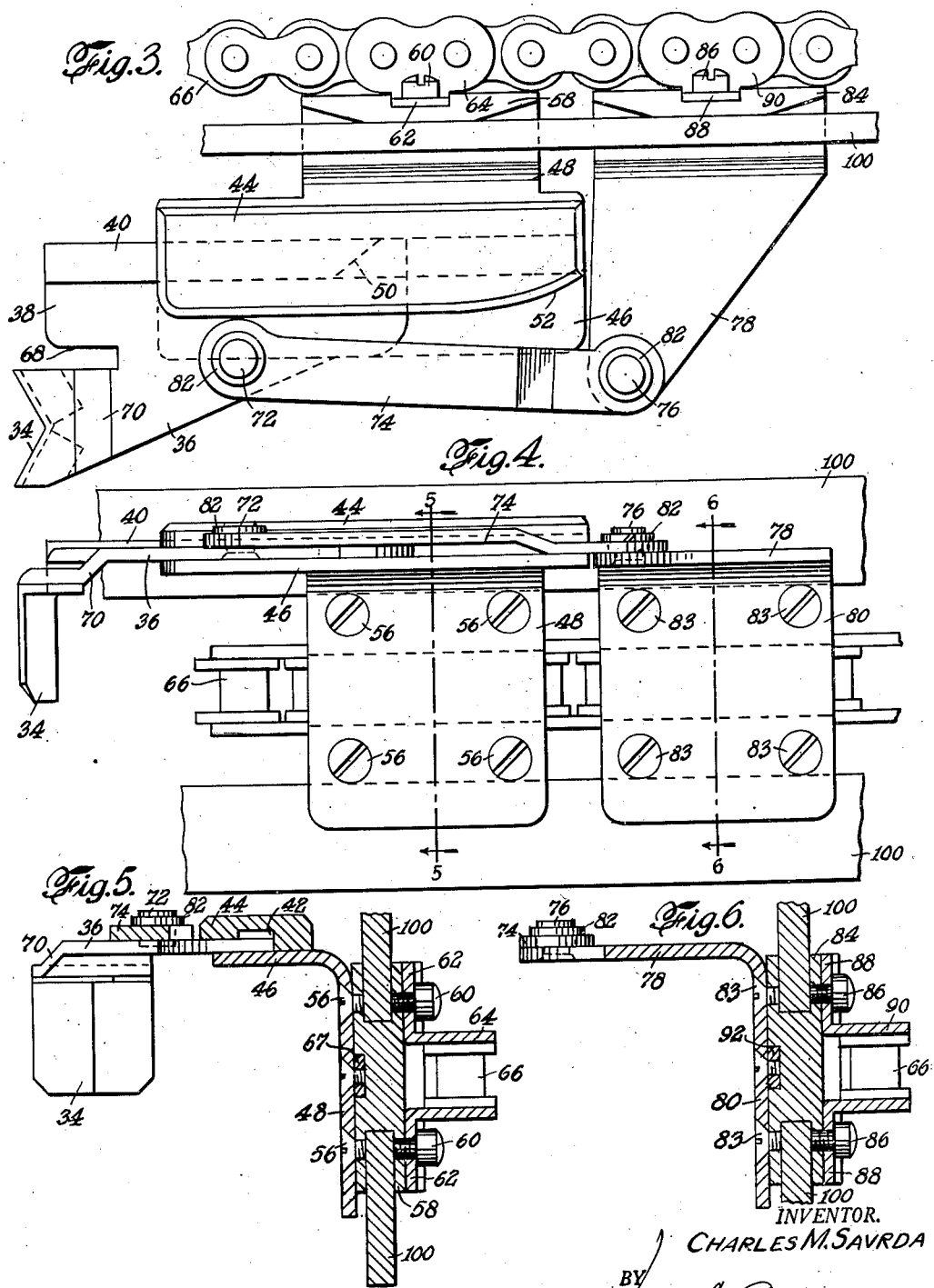

Patented Mar. 28, 1950

2,502,176

UNITED STATES PATENT OFFICE 2,502,176

FISH-FILLETING MACHINE

Charles M. Savrda, Bay Shore, N. Y., assignor, by mesne assignments, to Fish Machinery Corporation, Boston, Mass., a corporation of Delaware Application October 1, 1947, Serial No. 777,281

8 Claims. (Cl. 17—4)

This invention relates to fish-filleting machines. More particularly, it relates to new and improved apparatus for feeding a fish, tail leading and back downward, into the zone of action of back-cutting knives.

U. S. application Serial No. 698,097, filed September 20, 1946, discloses a new method of and apparatus for filleting fish which is particularly adapted for the filleting of redfish and wherein after a fish, tail leading and back downward, passes through the zone of action of a pair of spaced rotating circular back-slitting knives which slit the fish upwardly from the back, it is projected from the zone of action of the back-slitting knives onto a pair of ribbing knives disposed in position to permit the fish to assume approximately the path of travel which the fish normally tends to take upon leaving the zone of action of the back-slitting knives.

During passage through the zone of action of the back-slitting knives, the thin (unribbed portion) of the fish is slit upwardly from the back through the belly side, and thereafter the ribbed portion of the fish is slit upwardly through the back to the belly cavity in close proximity to the ribs and without passing through the belly cavity and incising the belly side of the fish.

The back-slitting means consists of a pair of spaced rotating circular knives, and a pair of spaced rotating hold-down discs cooperate with the back-incising knives to maintain the fish in position on the back-slitting knives. The hold-down discs are yieldingly mounted relative to the back-slitting knives whereby, as enlarged sections of the fish pass through the zone of action of the back-slitting knives, the hold-down discs will be automatically raised to accommodate the enlarged portions. The hold-down discs merely serve to maintain the fish in position on the back-slitting knives and do not incise the belly side of the fish. The fish is projected from the zone of action of the back-slitting knives and hold-down discs onto a pair of ribbing knives comprising a pair of spaced knives having cutting edges at the top thereof. The ribbing knives are spaced from each other to provide a passage at the bottom thereof in which the backbone of the fish passes. The ribbing knives are substantially vertically disposed and substantially parallel at the forward portion and thereafter diverge outwardly and upwardly from the forward extremity to the rear thereof. The ribbing knives sever the fillets from the backbone and ribs to which the uncut belly and belly membrane are still attached. At the discharge end of the ribbing knives a pair of cut-off knives are provided.

The fish, tail leading and back downward, is fed through a trough into the zone of action of the circular back-cutting knives by pusher fingers arranged on a continuous chain conveyor disposed in a horizontal plane. Means, such as a belly fin guide, is disposed intermediate the discharge end of the trough and the back-cutting knives and hold-down discs to maintain the fish in position as it passes into the zone of action of the back-cutting knives. The belly fin guide consists of two members, each pivotally mounted at the rear end thereof and inclined forwardly in a downward direction. The pusher fingers were made of a size so that as they pass around the return sprocket they would clear the belly fin guide. As a consequence, the pusher fingers delivered decapitated fish of a certain minimum length, i. e. 6 inches, to the zone of action of the back-cutting knives. When the decapitated fish were of a length substantially less than 6 inches they could not be utilized in the machine.

An object of this invention is to provide a fish-filleting machine with a new and improved means for feeding fish into the zone of action of circular cutting knives.

Another object of this invention is to provide a fish-filleting machine with means for feeding fish of lengths which heretofore were unable to be fed into the zone of action of the back-cutting knives.

Other and additional objects will become apparent hereinafter.

The objects of the invention are accomplished, in general, by feeding a decapitated fish, tail leading and back downward, through a trough into the zone of action of the back-cutting knives by a pusher finger which is automatically retracted as the chain which carries the pusher finger begins its travel about the return sprocket, whereby the pusher finger will avoid collision and clear the belly fin guide as it passes therebeneath.

The pusher finger is carried at one end of a pusher finger plate which is slidably mounted in a housing on a housing bracket secured to a side plate on ears provided on a link of the chain. One end of a pusher link is pivotally mounted on a stud carried by the pusher finger plate. The other end of the pusher link is pivotally mounted on a stud carried by a bracket which is secured to ears on another link of the chain.

In operation, when the chord between the brackets is increased, the pusher link will be moved rearwardly, with the result that the pusher finger plate, and hence the pusher finger, will be retracted automatically. This operation will occur when the chain link carrying the pusher plate bracket begins to pass around the return sprocket and the link carrying the other bracket is still on the straightaway. When the chord between the aforementioned brackets is decreased, as will occur when the link carrying the pusher plate bracket leaves the curved path about the sprocket and the link carrying the second bracket is still traveling in a curved path, the pusher link will be moved forwardly, with the result that the pusher finger plate and pusher finger will be moved forwardly automatically.

The chain travels about two spaced sprockets. The return sprocket is positioned relative to the discharge end of the trough and the belly fin guide so that, after a fish has been delivered by the pusher finger and the chain begins to travel around the sprocket, the pusher finger will be retracted and pass free and clear of the belly fin guide. Due to this arrangement, the pusher finger is made of a shape and size so that it can feed decapitated fish of lengths as small as 3½ inches into the zone of action of the back-cutting knives.

The invention will be more clearly understood by reference to the following detailed description when taken in connection with the accompanying drawings, in which:

Figure 1 is a plan view of the feeding mechanism and so much of a fish-filleting machine as is necessary for an understanding of the invention;

Figure 2 is a side elevation of the apparatus shown in Figure 1, with the feed trough omitted for purposes of clarity;

Figure 3 is an enlarged plan view of the pusher and a fragment of the chain;

Figure 4 is a front elevation of the detail shown in Figure 3;

Figure 5 is a section taken on the lines 5—5 of Figure 4; and

Figure 6 is a section taken on the lines 6—6 of Figure 4.

Referring now to the drawings wherein like references designate like parts, the reference numeral 10 designates a pair of circular spaced cutting knives mounted on a single rotating shaft 12 carried in suitable bearings mounted on the frame of the machine, not shown. Each of the knives 10 is provided with a cutting edge 14 and a plurality of spaced peripheral notches 16. Above the back-cutting knives 10, there is a pair of circular hold-down discs 18 mounted on a single shaft carried in a suitable bearing on the frame of the machine, not shown. The hold-down discs engage the belly side of a fish, fed tail leading and back downward, and serve to maintain the fish on the back-cutting knives 10 during the back-slitting operation. The hold-down discs 18 do not incise the fish and are yieldingly mounted, whereby they will be automatically raised and lowered to accommodate the portions of the fish passing therebeneath and engaged thereby. The fish, due to the rotation of the back-cutting knives 10 and the hold-down discs 18, is projected therefrom onto a pair of ribbing knives, not shown.

The specific details of construction of the back-cutting knives 10 and the hold-down discs 18, and the specific manner in which they are respectively mounted, as well as the ribbing knives (not shown), form no essential part of the present invention.

The fish is fed into the zone of action of the back-cutting knives 10 from a horizontal trough 24 by means of a pusher mechanism hereinafter more fully explained. The trough 24 may be provided with a plurality of yieldingly mounted guides 26 which aid in maintaining the fish in proper position. The specific construction of the guides 26 forms no part of this invention. Any well-known types can be used.

In order to maintain the fish in proper position for delivery from the trough 24 into the zone of action of the back-cutting knives 10, there is provided a belly fin guide. As shown in Figure 1, the belly fin guide comprises two members 30, each of which is pivotally mounted at the upper end thereof on a stud 32 appropriately mounted in the frame. Each belly fin guide member 30 extends forwardly and is inclined in a downward direction, as shown in Figure 2, and the forward end of each of the belly fin guide elements 30 terminates in spaced relationship, whereby the belly fin of a fish can pass therebetween. The forward lower ends of each of the fin guides are preferably curved, as shown in Figure 1, so that each can accommodate itself to the belly side of the fish which it may engage. It is to be noted, as shown in Figure 2, that the forward end of the belly fin guide terminates in close relationship with the hold-down discs 18 and in position to direct the belly fin passing therebetween into the space between the hold-down discs 18.

The fish is fed through the trough 24 by a pusher finger 34 located centrally of the trough and so that it can engage a decapitated fish at the decapitated end thereof. The pusher finger 34 is formed of a plate which is bent at the center thereof so that the sides diverge outwardly therefrom.

The pusher finger 34 depends from an arm 36 to which it is appropriately secured. The arm 36 is formed integrally with a slide plate 38 which has secured thereto a tongue 40 adapted to slide in a groove 42 of a housing 44. The housing 44 is secured to the top of a horizontal member 46 of a bracket 48. It is to be noted that the horizontal member 46 of the bracket 48 constitutes the surface on which the slide plate 38 moves, and the tongue 40 and groove 42 of the housing 44 constitute a guide therefor.

The trailing end 50 of the tongue 40 is cut away, as shown in Figure 3, and one side of the housing 44 is curved, as indicated by the reference numeral 52, so that movement of the parts will take place when the mechanism passing around a sprocket end 54 of the housing overlaps the groove 42 and constitutes a stop which, when it engages the end 50, limits the extreme movement of the tongue to the right in Figure 3.

The bracket 48 is secured by flat-headed screws 56 to one side of a block 58. Screws 60 secure ears 62 of a chain lug 64 of a continuous roller chain conveyor 66 to the block 58. The bracket 48 is keyed to the block 58 by the key 67.

As shown in Figure 3, a slot 68 is provided between the pusher finger 34 and the forward portion of the slide plate 38, and the pusher finger 34 is secured to a downwardly bent portion 70 of the arm 36. The slot 68 is at one edge of both the downwardly bent portion 70 and the pusher finger 34, and the arm 36 is of such a shape that the finger 34 is always spaced from the inner side of the horizontal member 46.

The slide plate 38 is provided with a stud 72 on which one end of a link 74 is pivotally mounted. The other end of the link 74 is pivotally mounted on a stud 76 carried by a horizontal member 78 of a bracket 80. Split washers 82 disposed on each of the studs 72 and 76 serve to maintain the link in position.

The bracket 80 is secured by means of screws 83 to a block 84. Screws 86 secure the ears 88 carried on a lug 90 of the chain to the block 84.

The bracket 80 is keyed to the block 84 by a key 92.

In the form shown, the bracket 80 is secured to the link 90 of the chain 66. The link 90 is spaced from and rearwardly of the link 64 to which the bracket 48 is secured. The blocks 58 and 84 ride and slide on a pair of rails 100.

The conveyor chain 66 which travels in a horizontal plane is trained over a sprocket 104 and a return sprocket 106, and the guide rails 100 are positioned parallel to the path of travel of the chain 66. Either or both of the sprockets 104 and 106 can be driven. The return sprocket is adjacent the discharge end of the trough 24.

Since the pusher mechanism travels in a circular path about each of the sprockets 104 and 106, the side plates 58 and 84 are cut away at each of the edges, as shown more fully in Figures 1 and 3 of the drawings, so when the mechanism passes around the sprocket it will conform substantially to the curvature of the rails, as shown in Figure 1.

In operation, a decapitated fish, tail leading and back downward, is disposed in the trough 24 and is fed therethrough by means of the pusher finger 34 which engages the fish at the rear end thereof. Due to the movement of the chain 66, the pusher finger mechanism and actuating means travel on the rails 100 and the pusher finger 34 feeds the fish from the trough 24 into the zone of action of the back-cutting knives. As previously mentioned, the pusher finger also feeds the fish from the trough so that the belly fin thereof will pass between the belly fin guide 30. The pusher finger 34, due to the dimensions and shape of the arm 36, is capable of feeding even a small fish into the zone of action of the back-cutting knives. As the bracket 48 begins to travel in the circular path about the sprocket 106, and, while the bracket 80 is still traveling in a straight line path, the chord between the brackets 48 and 80 is increased. This increase in chord causes the link 74 to move rearwardly. This rearward motion of the link 74 is imparted to the slide plate 38, with the result that the finger 34 is retracted and can pass free and clear of the belly fin guide 30. Thereafter, when the chord between the brackets 48 and 78 is decreased, the link 74 will move in a forward direction, with the result that the slide plate 38, and hence the pusher finger 34, will be moved forwardly to its normal position. The latter movement takes place when the chain links 64 and 90 leave the circular path from about either of the sprockets and begin to travel in a straight line path.

It will be apparent that the movement of the pusher finger is due to the increase or decrease in radius of the pivot 76 in passing from a straight line path to the path about the sprocket, and vice versa.

The invention provides a pusher mechanism which is capable of feeding fish as short as 3½ inches in length, tail leading and back downward, into the zone of action of the back-cutting knives without colliding with the belly fin guide.

Though the invention has been described with one pusher mechanism, any number thereof arranged in spaced relationship on the chain may be used. In one form, as shown in Figures 1 and 2, three pusher mechanisms are disclosed.

The apparatus of this invention can be used in filleting machines having a tilting trough, a tail elevator, and a tail guide of the type disclosed in copending application Serial No. 710,352, in conjunction with the belly fin guide, and in such filleting machines the pusher finger will pass free and clear of all of such elements.

The invention is also capable of use for feeding diverse materials.

Since it is obvious that various changes and modifications may be made in the above description without departing from the nature or spirit thereof, this invention is not restricted thereto except as set forth in the appended claims.

I claim:

1. A feeding apparatus comprising a pusher finger adapted to engage the article to be fed at the rear thereof, a slidably mounted pusher finger plate carrying said pusher finger, a continuously driven chain conveyer, a pair of longitudinally spaced sprockets about which said chain conveyer travels, means securing said pusher finger plate to a link of said chain conveyer, a bracket secured to a chain link rearwardly of the first-mentioned chain link, and a pusher link pivotally connected to both the pusher finger plate and said bracket whereby when the pitch radius between said sprocket and bracket is changed the pusher plate is slidably moved in accordance therewith.

2. A feeding apparatus comprising a pusher finger adapted to engage the article to be fed at the rear thereof, a slidably mounted pusher finger plate carrying said pusher finger, means to guide the movement of said pusher finger plate, a continuously driven chain conveyer, a pair of longitudinally spaced sprockets about which said chain conveyer travels, means securing said pusher finger plate to a link of said chain conveyer, a bracket secured to a chain link rearwardly of the first-mentioned chain link, and a pusher link pivotally connected to both the pusher finger plate and said bracket whereby when the pitch radius between said sprocket and bracket is changed the pusher plate is slidably moved in accordance therewith.

3. A feeding apparatus comprising a pusher finger adapted to engage the article to be fed at the rear thereof, a pusher finger plate carrying said pusher finger, a housing in which said pusher finger plate is slidably mounted, a continuously driven chain conveyer, a pair of longitudinally spaced sprockets about which said chain conveyer travels, means securing said housing to a link of said chain conveyer, a bracket secured to a chain link rearwardly of the first-mentioned chain link, and a pusher link pivotally connected to both the pusher finger plate and said bracket whereby when the pitch radius between said sprocket and bracket is changed the pusher plate is slidably moved in accordance therewith.

4. A feeding apparatus comprising a pusher finger adapted to engage the article to be fed at the rear thereof, a pusher finger plate carrying said pusher finger, a tongue on said pusher plate, a housing having a groove in which said tongue is slidably mounted, a continuously driven chain conveyer, a pair of longitudinally spaced sprockets over which said chain conveyer travels, means securing said housing to a link of said chain conveyer, a bracket secured to a chain link rearwardly of the first-mentioned chain link, and a pusher link pivotally connected to both the pusher finger plate and said bracket whereby when the pitch radius between said sprocket and bracket is changed the pusher plate is slidably moved in accordance therewith.

5. In a fish-filleting machine having a pair of spaced rotating circular back-slitting knives adapted to incise the back of a fish fed therethrough, tail leading and back downward, a feed trough, and a belly fin guide located in position to guide the belly fin during the feeding of the fish into the zone of action of said back-slitting knives, in combination a pusher finger positioned centrally in said trough, a slidably mounted pusher finger plate carrying said pusher finger, a continuously driven chain conveyer, a pair of sprockets longitudinally spaced along said trough with one of said sprockets being adjacent said belly fin guide, said chain conveyer being mounted on said sprockets for travel with a straight traverse leading towards said belly fin guide and knives, means securing said pusher finger plate to a link of said chain conveyer, a bracket secured to a chain link rearwardly of the first-mentioned chain link and a pusher link pivotally connected to both the pusher finger plate and said bracket whereby when the pitch radius between said one sprocket and bracket is changed the pusher plate is slidably moved in accordance therewith.

6. In a fish-filleting machine having a pair of spaced rotating circular back-slitting knives adapted to incise the back of a fish fed therethrough, tail leading and back downward, a feed trough, and a belly fin guide located in position to guide the belly fin during the feeding of the fish into the zone of action of said back-slitting knives, in combination a pusher finger positioned centrally in said trough, a slidably mounted pusher finger plate carrying said pusher finger, means to guide the movement of said pusher finger plate, a continuously driven chain conveyer, a pair of sprockets longitudinally spaced along said trough with one of said sprockets being adjacent said belly fin guide, said chain conveyer being mounted on said sprockets for travel with a straight traverse leading towards said belly fin guide and knives, means securing said pusher finger plate to a link of said chain conveyer, a bracket secured to a chain link rearwardly of the first-mentioned chain link and a pusher link pivotally connected to both the pusher finger plate and said bracket whereby when the pitch radius between said one sprocket and bracket is changed the pusher plate is slidably moved in accordance therewith.

7. In a fish-filleting machine having a pair of spaced rotating circular back-slitting knives adapted to incise the back of a fish fed therethrough, tail leading and back downward, a feed trough, and a belly fin guide located in position to guide the belly fin during the feeding of the fish into the zone of action of said back-slitting knives, in combination a pusher finger positioned centrally in said trough, a pusher finger plate carrying said pusher finger, a housing in which said pusher finger plate is slidably mounted, a continuously driven chain conveyer, a pair of sprockets longitudinally spaced along said trough with one of said sprockets being adjacent said belly fin guide, said chain conveyer being mounted on said spockets for travel with a straight traverse leading towards said belly fin guide and knives, means securing said housing to a link of said chain conveyer, a bracket secured to a chain link rearwardly of the first-mentioned chain link and a pusher link pivotally connected to both the pusher finger plate and said bracket whereby when the pitch radius between said one sprocket and bracket is changed the pusher plate is slidably moved in accordance therewith.

8. In a fish-filleting machine having a pair of spaced rotating circular back-slitting knives adapted to incise the back of a fish fed therethrough, tail leading and back downward, a feed trough, and a belly fin guide located in position to guide the belly fin during the feeding of the fish into the zone of action of said back-slitting knives, in combination a pusher finger positioned centrally in said trough, a pusher finger plate carrying said pusher finger, a tongue on said pusher plate, a housing having a groove in which said tongue is slidably mounted, a continuously driven chain conveyer, a pair of sprockets longitudinally spaced along said trough with one of said sprockets being adjacent said belly fin guide, said chain conveyer being mounted on said sprockets for travel with a straight traverse leading towards said belly fin guide and knives, means securing said housing to a link of said chain conveyer, a bracket secured to a chain link rearwardly of the first-mentioned chain link and a pusher link pivotally connected to both the pusher finger plate and said bracket whereby when the pitch radius between said one sprocket and bracket is changed the pusher plate is slidably moved in accordance therewith.

CHARLES M. SAVRDA.

REFERENCES CITED

The following references are of record in the file of this patent:

UNITED STATES PATENTS

| Number | Name | Date |
|---|---|---|
| 2,397,158 | Savrda | Mar. 26, 1946 |